United States Patent [19]

Yoshida

[11] 4,334,312
[45] Jun. 8, 1982

[54] PHASE SYNCHRONIZING CIRCUIT FOR USE IN MULTI-LEVEL, MULTI-PHASE, SUPERPOSITION-MODULATED SIGNAL TRANSMISSION SYSTEM

[75] Inventor: Yasuharu Yoshida, Tokyo, Japan

[73] Assignee: Nippon Electric Co., Ltd., Tokyo, Japan

[21] Appl. No.: 175,988

[22] Filed: Aug. 7, 1980

[30] Foreign Application Priority Data

| Aug. 10, 1979 | [JP] | Japan | 54-101940 |
| Feb. 12, 1980 | [JP] | Japan | 55-15684 |
| Feb. 18, 1980 | [JP] | Japan | 55-18733 |

[51] Int. Cl.³ ............................................ H03D 13/00
[52] U.S. Cl. .................................... 375/20; 375/42; 375/81; 329/104; 329/112; 329/122
[58] Field of Search .................... 375/80, 81, 88, 94, 375/119, 120, 20, 42; 329/104, 112, 122, 50, 124-126

[56] References Cited

U.S. PATENT DOCUMENTS

| 3,737,578 | 6/1973 | Matsuo | 375/81 |
| 3,924,197 | 12/1975 | Okano | 375/81 |
| 3,970,946 | 7/1976 | Matsuo | 329/104 |
| 3,983,499 | 9/1976 | Tan | 329/104 |
| 4,039,961 | 8/1977 | Ishio | 329/112 |
| 4,095,187 | 6/1978 | Yoshida | 375/20 |
| 4,099,130 | 7/1978 | Yoshida | 329/104 |
| 4,143,322 | 3/1979 | Shimamura | 375/81 |

*Primary Examiner*—Benedict V. Safourek
*Assistant Examiner*—Stephen Chin
*Attorney, Agent, or Firm*—Sughrue, Mion, Zinn, Macpeak & Seas

[57] ABSTRACT

A multi-level, multi-phase, superposition-modulated signal is phase detected in a four-phase phase detector with the output from a voltage controlled oscillator (VCO). The P and Q outputs from the phase detector are supplied to a plurality of phase shifters and level discriminators to generate a plurality of digital signals corresponding to various phase positions of the received signal, and the P and Q signals are also supplied to demodulator and logic circuitry. Mutually orthogonal pairs of outputs from the level discriminators are frequency multiplied in Exclusive OR (EOR) gates, the outputs of which are selectively passed through a gate circuit in accordance with the phase position of the received signal determined by the output of the logic circuitry. A pair of mutually orthogonal demodulator outputs are also frequency multiplied by combination in a second EOR gate, and the output of the gate circuit is then frequency doubled by EOR combination with the output of the second EOR gate. This frequency-quadrupled signal is then supplied as the control voltage to the VCO.

11 Claims, 12 Drawing Figures

PHASE SYNCHRONIZING CIRCUIT FOR USE IN MULTI-LEVEL, MULTI-PHASE, SUPERPOSITION-MODULATED SIGNAL TRANSMISSION SYSTEM

BACKGROUND OF THE INVENTION

The present invention relates to a phase synchronizing circuit to efficiently reproduce a reference carrier wave from multi-level, multi-phase modulated carrier waves.

The transmission of digital-signal-modulated carrier waves by the use of multi-phase phase shift keying (PSK) modulation is already applied for practical application. At the same time, with an eye to more efficient utilization of the frequency band, the feasibility of so-called multi-level, multi-phase, superposition-modulated signal transmission systems, by which both the phase and the amplitude of the carrier are concurrently modulated by digital signals, is now under study. One such multi-level, multi-phase, superposition-modulated signal transmission systems is known the 16 quadrature amplitude modulation (QAM) system.

This 16 QAM system, though greater in information transmitting capacity, involves difficulties in circuit structuring. Its application to a carrier wave reproducing circuit, in particular, gives rise to new difficulties, other than those encountered with multi-phase phase-shift-keyed (PSK) carrier waves. While the output signal vectors of a multi-phase PSK carrier wave have equal amplitudes and equal phase differences, those of a 16 QAM wave have mutually different amplitudes and different phase differences. Therefore, unlike the case of multi-phase PSK carrier wave reproducing circuits, means to simply frequency-multiply the input signal would have no place in 16 QAM carrier wave reproducing circuits. One example of a 16 QAM carrier wave reproducing circuit example of which is the phase synchronizing circuit described in my U.S. Pat. No. 4,099,130. The phase synchronizing circuit consists of means for detecting the phase position of each modulated signal by the use of demodulated signals; means for driving a phase modulator, an amplitude modulator or an analog switch with the output signal of said detecting means as control signal and thereby generating four modulated signal vectors, one of which exists in each of the four quadrants of the vector diagram representing the phases and amplitudes of the modulated carrier wave, into one signal vector to equivalently convert a 16 QAM modulated carrier wave into a 4 PSK modulated carrier wave; and 4 PSK phase synchronizing means.

Such a phase synchronizing circuit is useful for constructing a carrier wave reproducing circuit for 16 QAM, and especially so as a base band processing phase synchronizing circuit, which is easy to handle. They, however, have the following disadvantages. First, an analog switch is an indispensable circuit therein, but it is difficult to realize an analog switch which is free from DC drift, satisfactory in input/output characteristics and moreover fast acting. Secondly, although the control signal for the analog switch should coincide with the input signal in bit timing, the control signal, because it is made from a data signal which has once gone through discrimination, lags behind the input signal by half a bit repetition period. Accordingly, an analog delay line is required to delay the input signal by half a bit repetition period, but no well performing analog delay line is currently available, and the inadequacy of this line constitutes a factor to invite performance deterioration.

SUMMARY OF THE INVENTION

One objective of the present invention therefore is to provide a base band processing phase synchronizing circuit for multi-level, multi-phase superposition-modulated signal transmission systems, which requires neither an analog switch nor an analog delay line.

Another objective of the invention is to provide a phase synchronizing circuit for multi-level, multi-phase superposition-modulated signal transmission systems, which enables the circuit dimensions to be reduced without inviting performance deterioration.

Still another objective of the invention is to provide a phase synchronizing circuit for multi-level, multi-phase superposition-modulated signal transmission systems, which has a wide lock range.

According to the present invention, there is provided a phase synchronizing circuit comprising: voltage-controlled oscillator (VCO) means responsive to a control signal for varying its oscillation frequency; means for phase-detecting a multi-level, multi-phase superposition-modulated carrier wave with reference to the phase of the output of the VCO means; means for demodulating the output of the phase detector means to provide a demodulated signal; means responsive to the demodulated signal for determining the phase position of the modulated carrier wave with respect to the output phase of the VCO means; a plurality of means for phase-shifting the output of the phase detector means by prescribed values; a plurality of means for discriminating the outputs of the plurality of phase shifter means with reference to a prescribed threshold level; a plurality of first frequency-multiplier means for frequency-multiplying each pair of mutually orthogonal outputs among the outputs of the plurality of discriminator means; second frequency-multiplier means for frequency-multiplying each pair of mutually orthogonal outputs among the outputs of the demodulator means; first gate means responsive to the output of the determining means for selectively passing therethrough the output, among the outputs of the plurality of first frequency-multiplier means; third frequency-multiplier means for frequency-multiplying the pair of the output of the first gate means and that of the second frequency-multiplier means; and means for supplying the VCO means with the output of the third frequency-multiplier means as the control signal.

BRIEF DESCRIPTION OF THE DRAWINGS

Features and advantages of the invention will be more apparent from the following detailed description taken in conjunction with the accompanying drawings, in which:

FIG. 12 illustrates a modified version of the phase synchronizing circuit shown in FIG. 1.

DETAILED DESCRIPTION OF THE PREFERRED EMBODIMENTS

Figure 1:
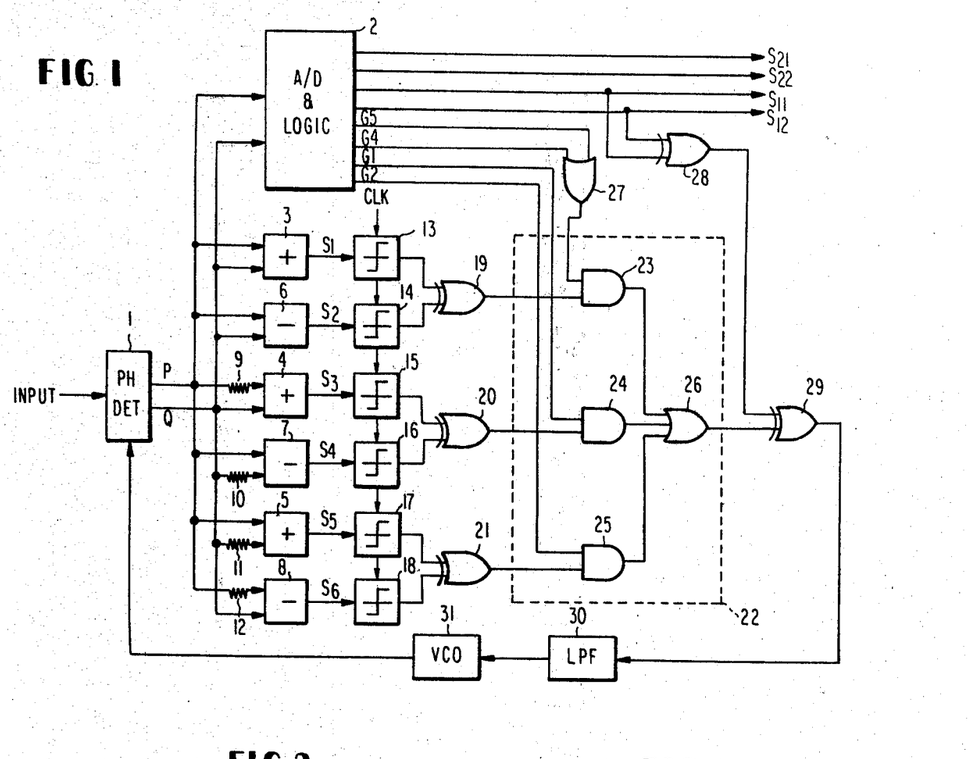
FIG. 1 is a block diagram of a phase synchronizing circuit for a 16 QAM modulated wave, which is one embodiment of the present invention.

Referring now to FIG. 1, if a four-phase PSK modulated carrier wave is entered into a 4-phase phase detector 1, the input four-phase PSK modulated wave is orthogonally detected by this 4-phase phase detector 1 with the output of a voltage-controlled oscillator (VCO) 31 being used as reference carrier wave, and emitted as in-phase and quadrature outputs P and Q. These detection outputs P and Q are turned into an addition signal by an adder 3 and into a subtraction signal by a subtractor 6. These addition and subtraction signals, after being respectively shaped into digital signals by discriminator-shaper circuits 13 and 14 in synchronization with a clock signal, are subjected to exclusive OR operation by an exclusive OR (EX-OR) circuit 19. The detection outputs P and Q are also turned into demodulation signals $S_{11}$ and $S_{12}$ by an analog/digital (A/D) converting and logic circuit 2 (which may consist, for instance, of the circuit shown in FIG. 7 of the aforementioned U.S. Patent). These signals $S_{11}$ and $S_{12}$ are subjected to exclusive OR operation by an EX-OR circuit 28. The outputs of the EX-OR circuits 19 and 28 are further subjected to exclusive OR operation by an EX-OR circuit 29, whose output is supplied through a low-pass filter 30 to the VCO 31 as its control signal.

The circuit involving the detector 1, adder 3, subtractor 6, discriminator-shaper circuits 13 and 14, discriminator-shaper circuits in the A/D converting and logic circuit 2, EX-OR circuits 19, 28 and 29, LPF 30 and VCO 31 constitutes a four-phase phase synchronizing circuit. For further details of such phase synchronizing circuit, reference is made to Japan Patent Publication No. 53-9704. A phase synchronizing circuit having such a composition operates normally as long as a four-phase PSK modulated wave is fed to it as the input signal.

Figure 2:
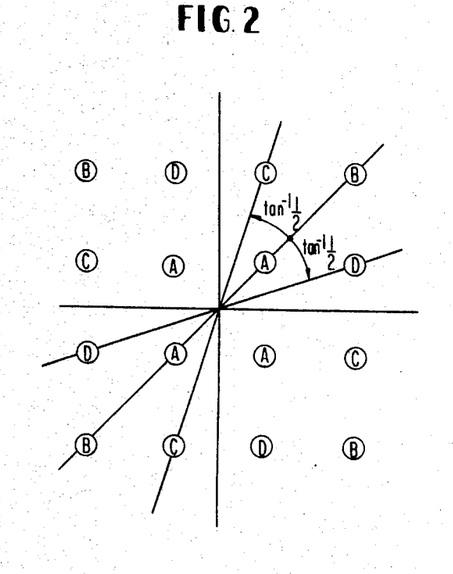
FIG. 2 is a signal disposition diagram of 16 QAM system.
Figure 3:
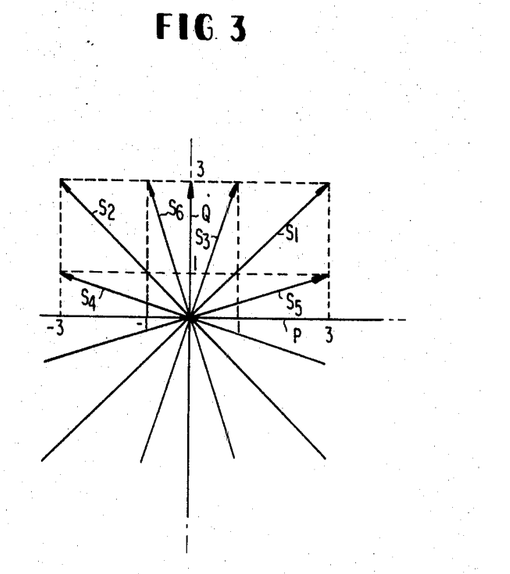
FIG. 3 is vector diagram of the 16 QAM wave for explaining the operation of the circuit shown in FIG. 1.

However, if a 16 QAM carrier wave shown in FIG. 2 is fed as the input, while modulated carrier waves represented by letters A and B in the figure are treated as phase error signals, those represented by letters C and D, whose phases are off those of A and B by $\pm \tan^{-1}\frac{1}{2}$, are handled as noise. Therefore, so that the modulated carrier waves represented by letters C and D can also be utilized as phase error signals, signals $S_3$ through $S_6$ having vectors shown in FIG. 3 are made, wherein $S_1$ through $S_6$ correspond to those represented by letters A through D in FIG. 2. The signals $S_3$ through $S_6$ can be obtained by altering the amplitude ratio of the orthogonal signals P and Q and subjecting them to addition or subtraction. This process is achieved with attenuators 9 through 12, adders 4 and 5, and subractors 7 and 8.

The A/D converting and logic circuit 2 gives as its outputs the first demodulation signals $S_{11}$ and $S_{12}$, second demodulation signals $S_{21}$ and $S_{22}$, and decision signals $G_1$, $G_2$, $G_4$ and $G_5$. The decision signals $G_1$, $G_2$, $G_4$ and $G_5$ are signals to distinguish from others the signal waves represented by letters D, C, B and A, respectively. The signals outputted from the A/D converting and logic circuit 2 are signals digitized by discriminator-shaper circuits in synchronization with the clock signal.

If the input is one signal of letters A and B in FIG. 2, the output of the EX-OR circuit 19 is taken out by means of the OR output of the decision signals $G_5$ and $G_4$, i.e., the output of an OR circuit 27, and an AND circuit 23. If it is a signal of letter C, the output of an EX-OR circuit 20 is taken out by means of an AND circuit 24 and the decision signal $G_1$. Similarly, if it is a signal of letter D, the output of an EX-OR circuit 21 is taken out by means of an AND circuit 25 and the decision signal $G_2$. The signal obtained by these procedures are subjected to OR operation by an OR circuit 26, so that the resultant output will be frequency-doubled signals, with the input signals of letters C and D being also processed as phase error signals. The output of the OR circuit 26 is frequency-doubled by the EX-OR circuit 29 whose output is supplied by way of the LPF 30 to the VCO 31 to control this VCO 31, which feeds reference carrier wave to the 4-phase phase detector 1. With the foregoing construction, the circuit of FIG. 1 can operate as a phase synchronizing circuit reproducing the reference carrier wave with little phase jitter.

A characteristic feature of this circuit described above consists in that, because the signals having vectors $S_1$ through $S_6$ are once discriminated and converted into digital signals by the discriminator-shaper circuits 13 through 18, the analog switch in a similar circuit of prior art can be replaced with a digital gate circuit 22. Furthermore, the timing of control signals ($G_1$, $G_2$, $G_4$ and $G_5$) and that of the input signals (the outputs of the EX-OR circuits 19 through 21) in the gate circuit 22 are approximately coincident because both of the input and control signals had been sampled by the same clock signal. This results in that no analog delay line is required unlike in a similar circuit of prior art.

Figure 4:
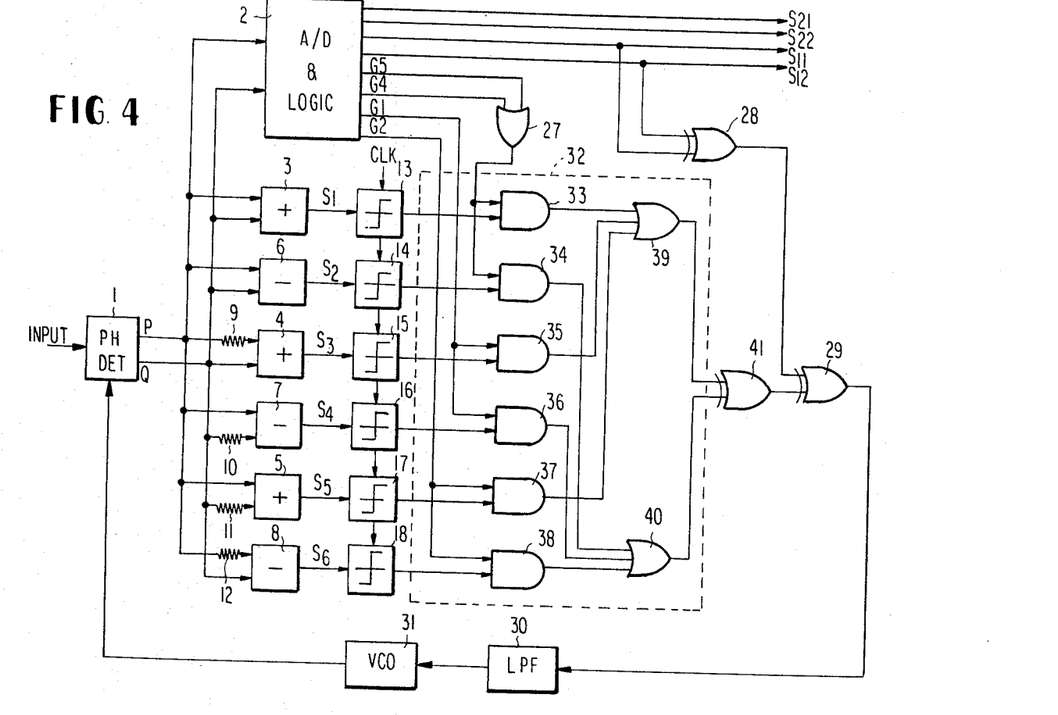
FIG. 4 is a block diagram of a phase synchronizing circuit for a 16 QAM modulated wave, which is another embodiment of the invention.

FIG. 4 illustrates another embodiment of the present invention applied to a 16 QAM system, wherein reference numeral 32 represents a gate circuit; 33 through 38, AND circuits; 39 and 40, OR circuits; and 41, an EX-OR circuit. The embodiment of FIG. 4 differs from that of FIG. 1 in the position of the gate circuit. While in FIG. 1 digital signals emitted from the discriminator-shaper circuits 13 to 18 are entered into the gate circuit 22 after being frequency-doubled by the EX-OR circuits 19 through 20, in FIG. 4 relevant digital signals are selected by the gate circuit 32 before they are frequency-doubled by the EX-OR circuit 41. They operate essentially in the same way and are roughly equal in circuit dimensions, but differ in the extent to which AND circuits and OR circuits are used.

Figure 5:
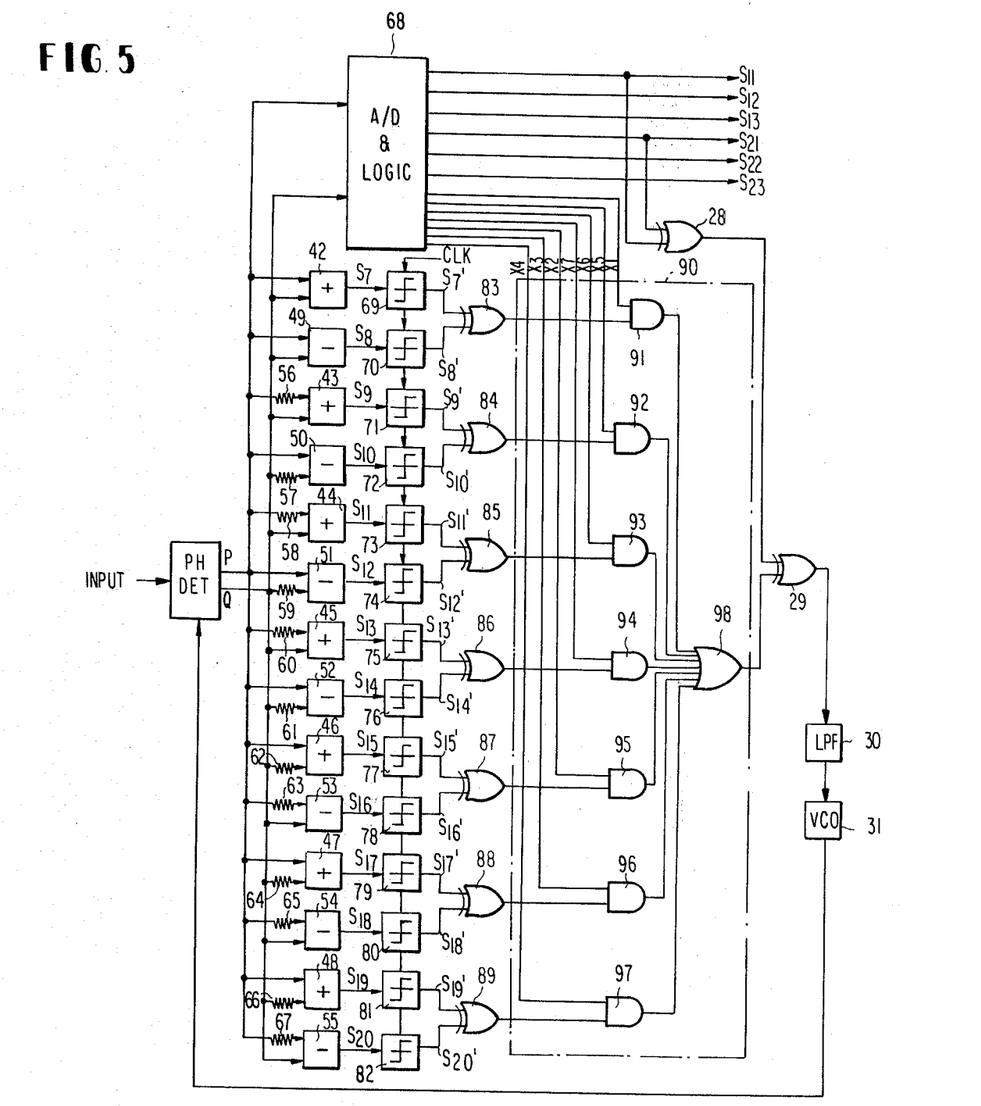
FIG. 5 is a block diagram of a phase synchronizing circuit for a 36 QAM modulated wave, which is still another embodiment of the invention.
Figure 6:
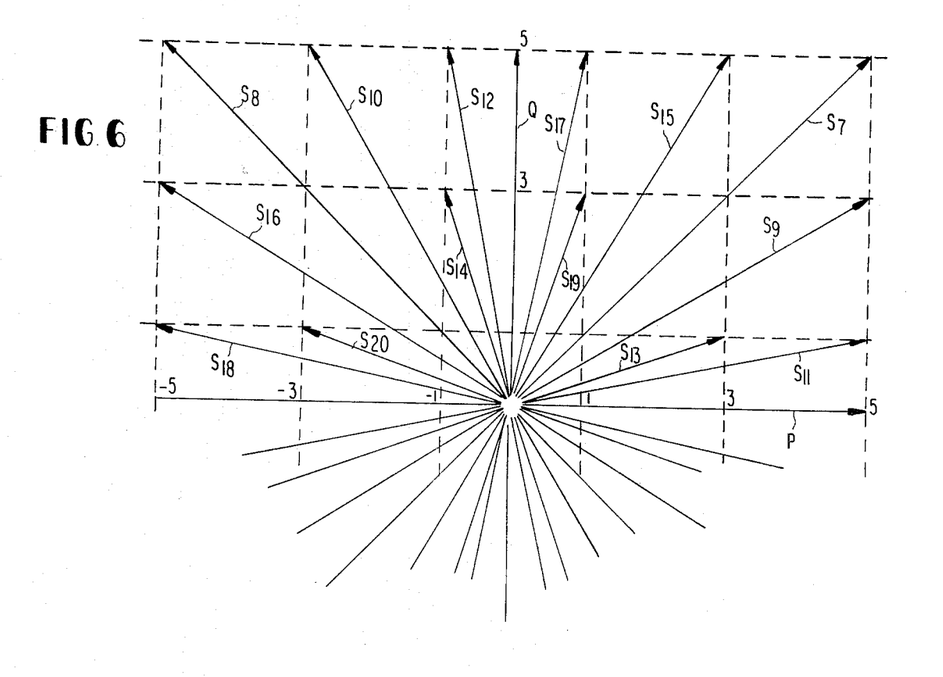
FIGS. 6 and 7 are respectively vector and signal disposition diagrams of the 36 QAM wave for explaining the operation of the circuit shown in FIG. 5.

FIG. 5 shows an embodiment of the invention applied to a 36 QAM system. An input signal is phase-detected by a 4-phase phase detector 1 to be turned into signals P and Q which are in an orthogonal relationship to each other. The signals P and Q are subjected to addition or subtraction at a certain amplitude ratio by attenuators 56 through 67 and adders 42 through 48 or subtractors 49 through 55 to be turned into signals $S_7$ through $S_{20}$. FIG. 6 shows phase relationships of $S_7$ through $S_{20}$ against P and Q.

Then, the signals $S_7$ through $S_{20}$ are discriminated and shaped into two-level digital signals, which are entered into a gate circuit 90 after being frequency-doubled by EX-OR circuits 83 through 89 in the pairs of $S_7'$ and $S_8'$, $S_9'$ and $S_{10}'$, $S_{11}'$ and $S_{12}'$, $S_{13}'$ and $S_{14}'$, $S_{15}'$ and $S_{16}'$, $S_{17}'$ and $S_{18}'$, and $S_{19}'$ and $S_{20}'$. In the gate circuit 90, the output of the EX-OR circuit 83 is selected by a control signal $X_1$, that of the EX-OR circuit 84 by $X_5$, that of the EX-OR circuit 85 by $X_6$, that of the EX-OR circuit 86 by $X_7$, that of the EX-OR circuit 87 by $X_2$, that of the EX-OR circuit 88 by $X_3$ and that of the EX-OR circuit 89 by $X_4$, and these outputs are put together by an OR circuit 98 to be made the output of the gate circuit 90. The control signals $X_1$ through $X_7$ are signals by which the positions of modulated signals are determined, and the relationships between the control and modulated signals are charted in FIG. 7. The signals $X_1$ through $X_7$ are generated by and A/D converting and logic circuit 68.

Figure 7:
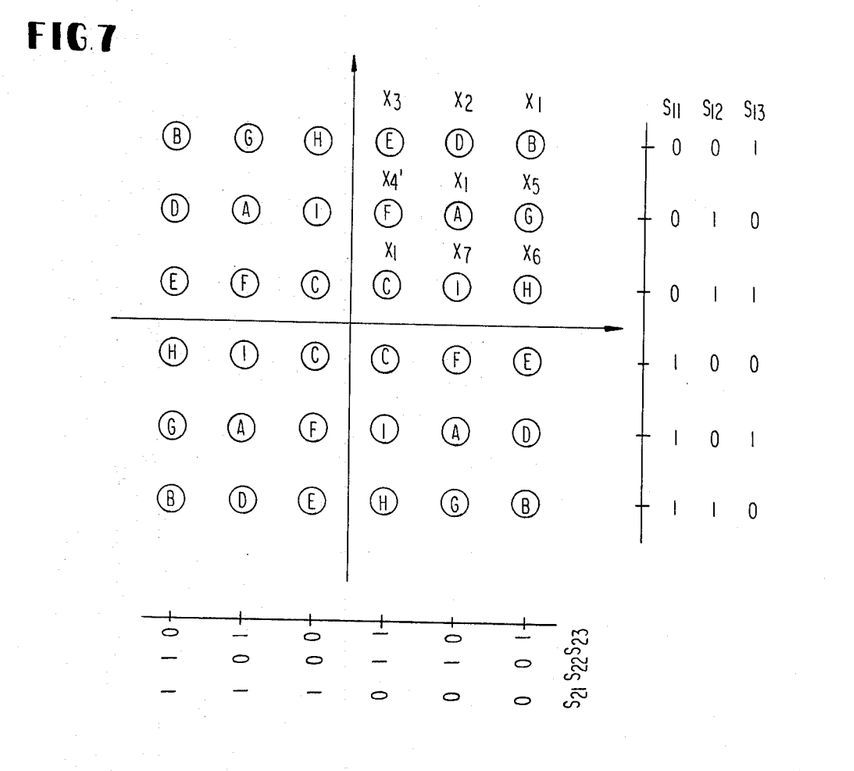
Figure 8:
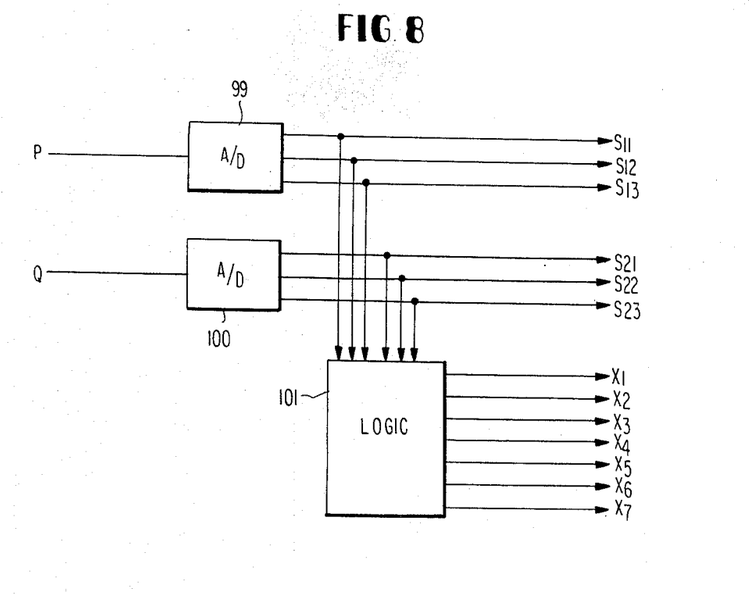
FIG. 8 is a block diagram of analog/digital (A/D) converters for use in the circuit shown in FIG. 5.

FIG. 8 illustrates an embodiment of the A/D converting and logic circuit concept, wherein reference numerals 99 and 100 denote A/D converter sections; and 101, a logic circuit. The A/D converter sections 99 and 100 are of a natural binary type, and the relationships between modulated signals and demodulated signals $S_{11}$ through $S_{23}$ are charted in FIG. 7. Whereas the circuit composition of the A/D converter sections 99 and 100 can be obtained by expanding the circuit illustrated in FIG. 7 of the aforementioned U.S. Pat. No. 4,099,130, to be more specific the circuit described in the laid-open Japanese patent application No. 53-1183354 can be used for this purpose. The logic circuit, which gives $X_1$ through $X_7$ as its output, is composed in accordance with Table 1 which is a truth table.

TABLE 1

| Quadrant | $S_{11}$ | $S_{12}$ | $S_{13}$ | $S_{21}$ | $S_{22}$ | $S_{23}$ |
|---|---|---|---|---|---|---|
| Signals corresponding to letter A: | | | | | | |
| 1 | 0 | 1 | 0 | 0 | 1 | 0 |
| 2 | 0 | 1 | 0 | 1 | 0 | 1 |
| 3 | 1 | 0 | 1 | 1 | 0 | 1 |
| 4 | 1 | 0 | 1 | 0 | 1 | 0 |
| Signals corresponding to letter B: | | | | | | |
| 1 | 0 | 0 | 1 | 0 | 0 | 1 |
| 2 | 0 | 0 | 1 | 1 | 1 | 0 |
| 3 | 1 | 1 | 0 | 1 | 1 | 0 |
| 4 | 1 | 1 | 0 | 0 | 0 | 1 |
| Signals corresponding to letter C: | | | | | | |
| 1 | 0 | 1 | 1 | 0 | 1 | 1 |
| 2 | 0 | 1 | 1 | 1 | 0 | 0 |
| 3 | 1 | 0 | 0 | 1 | 0 | 0 |
| 4 | 1 | 0 | 0 | 0 | 1 | 1 |
| Signals corresponding to letter D: | | | | | | |
| 1 | 0 | 0 | 1 | 0 | 1 | 0 |
| 2 | 0 | 1 | 0 | 1 | 1 | 0 |
| 3 | 1 | 1 | 0 | 1 | 0 | 1 |
| 4 | 1 | 0 | 1 | 0 | 0 | 1 |
| Signals corresponding to letter E: | | | | | | |
| 1 | 0 | 0 | 1 | 0 | 1 | 1 |
| 2 | 0 | 1 | 1 | 1 | 1 | 0 |
| 3 | 1 | 1 | 0 | 1 | 0 | 0 |
| 4 | 1 | 0 | 0 | 0 | 0 | 1 |
| Signals corresponding to letter F: | | | | | | |
| 1 | 0 | 1 | 0 | 0 | 1 | 1 |
| 2 | 0 | 1 | 1 | 1 | 0 | 1 |
| 3 | 1 | 0 | 1 | 1 | 0 | 0 |
| 4 | 1 | 0 | 0 | 0 | 1 | 0 |

TABLE 1-continued

| Quadrant | $S_{11}$ | $S_{12}$ | $S_{13}$ | $S_{21}$ | $S_{22}$ | $S_{23}$ |
|---|---|---|---|---|---|---|
| Signals corresponding to letter G: | | | | | | |
| 1 | 0 | 1 | 0 | 0 | 0 | 1 |
| 2 | 0 | 0 | 1 | 0 | 0 | 1 |
| 3 | 1 | 0 | 1 | 1 | 1 | 0 |
| 4 | 1 | 1 | 0 | 1 | 1 | 0 |
| Signals corresponding to letter H: | | | | | | |
| 1 | 0 | 1 | 1 | 0 | 0 | 1 |
| 2 | 0 | 0 | 1 | 1 | 0 | 0 |
| 3 | 1 | 0 | 0 | 1 | 1 | 0 |
| 4 | 1 | 1 | 0 | 0 | 1 | 1 |
| Signals corresponding to letter I: | | | | | | |
| 1 | 0 | 1 | 1 | 0 | 1 | 0 |
| 2 | 0 | 1 | 0 | 1 | 0 | 0 |
| 3 | 1 | 0 | 0 | 1 | 0 | 1 |
| 4 | 1 | 0 | 1 | 0 | 1 | 1 |

Figures 9, 10:
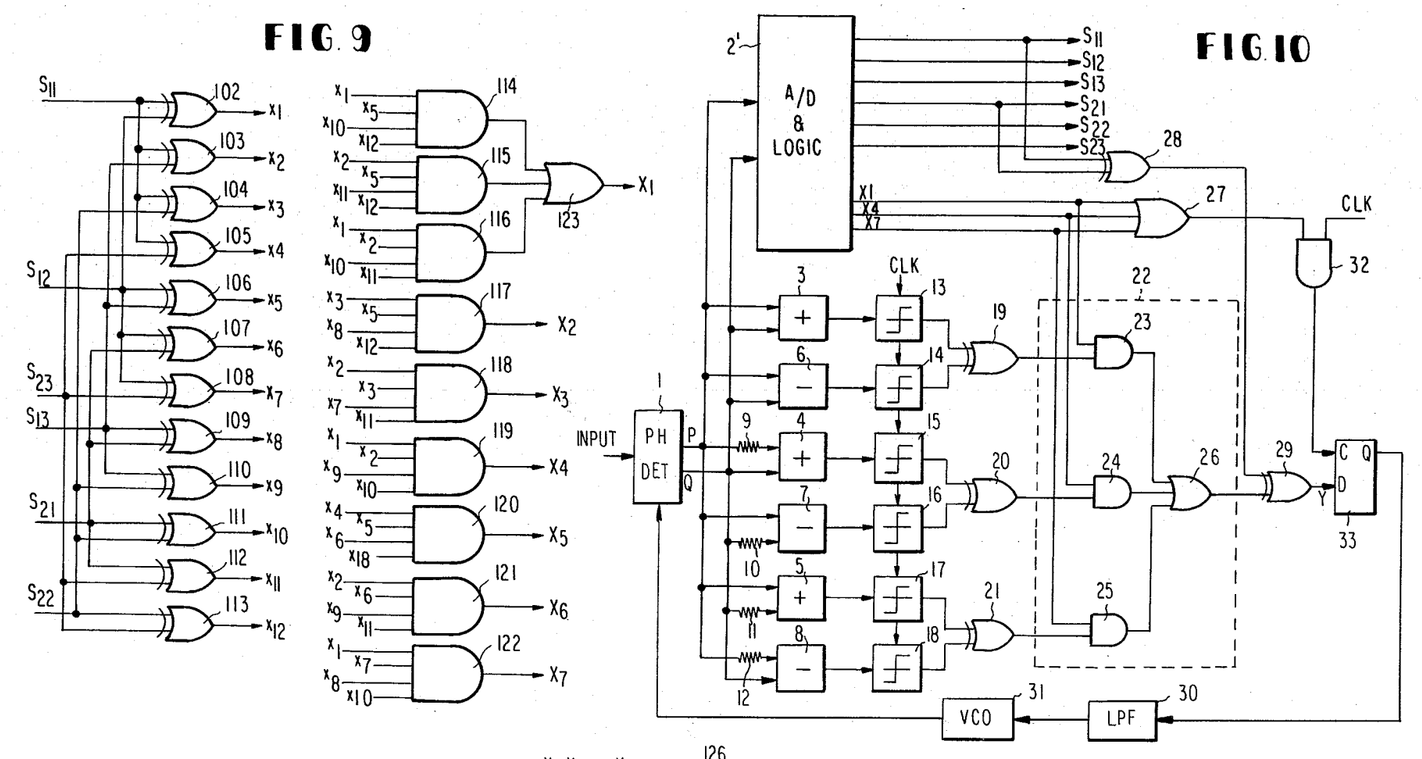
FIG. 9 is a block diagram of the logic circuit section of the circuit shown in FIG. 8.
FIG. 10 illustrates a modified version of the phase synchronization circuit for a 36 QAM modulated wave shown in the FIG. 5.

FIG. 9 illustrates an example of the logic circuit 101, wherein reference numerals 102 through 113 denote EX-OR circuits, 114 through 122, AND circuits; and 123, an OR circuit. The logic circuit of FIG. 9 is composed on the basis of the truth table of Table 1.

In the operation mentioned above, the output of the gate circuit 90 of FIG. 5 can be regarded as phase error signals obtained by converting 36 QAM signals equivalently to 4 PSK signals and frequency-doubling them. This output is further frequency-doubled by an EX-OR circuit 29, resulting altogether in its frequency-quadrupling; therefore, there can be provided the phase error signal of the 36 QAM signal. The phase error signal is then supplied by way of an LPF 30 to a VCO 31 as a control signal and the output of this VCO 31 is supplied to the phase detector 1, with the foregoing configuration, the circuit of FIG. 5 operates normally as a phase synchronizing circuit.

FIG. 10 shows a modification of the phase synchronizing circuit for 36 QAM modulated waves shown in FIG. 5. The phase synchronizing circuit of FIG. 5, because it handles signals in digital all the way except in a phase shift circuit at the initial stage of input, has an advantage that performance deterioration due to the imperfection of circuit composition is eliminated even if the number of superpositions increases to expand the circuit dimensions. However, it has a disadvantage that an increase in the number of superpositions would invite an abrupt expansion of circuit dimensions because of its too faithful processing of input signals. The circuit of FIG. 10 has been so structured as to obviate this disadvantage and achieve a comparable performance to the phase synchronizing circuit of FIG. 5 in smaller circuit dimensions.

An input signal is phase-detected in the phase detector 1 by the use of the output of a VCO 31 to be turned into signals P and Q which are in an orthogonal relationship to each other. The signals P and Q are subjected to addition or subtraction at a certain amplitude ratio by attenuators 9 through 12 and adders 3 through 5 or subtractors 6 through 8 to be turned into signals $S_1$ through $S_6$. The signals $S_1$ through $S_6$ have phase relationships corresponding to one or another of letters A, B, C, F and I in FIG. 7; in other words, $S_1$ and $S_2$, $S_3$ and $S_4$, and $S_5$ and $S_6$ are pairs of mutually orthogonal signals. Accordingly, the phase synchronizing circuit of FIG. 10 does not process all the 36 signal points shown in FIG. 7 as phase error signals, but selectively processes only some of them (i.e. A, B, C, F and I).

The signals $S_1$ through $S_6$ are discriminated and shaped into two-level digital signals by discriminator-shaper circuits 13 through 18 in synchronization with a clock signal. The orthogonal pairs of the discriminated signals $S_1$ through $S_6$ are entered into a gate circuit 22 after being frequency-doubled by EX-OR circuits 19 through 21. In the gate 22 the outputs of EX-OR circuits are gated through AND gates 23 through 25 by control signals $X_1$, $X_4$ and $X_7$, and the resultant outputs are put together by an OR circuit 26 to be made the output of the gate circuit 22. The control signals $X_1$, $X_4$ and $X_7$ are signals by which the positions of input modulated signals are determined, and have such relationships of correspondence as are charted in FIG. 7. These control signals are generated by an A/D converting and logic circuit 2, which is composed by so modifying the logic circuit shown in FIGS. 8 and 9 as to provide only signals $X_1$, $X_4$ and $X_7$.

Since the output of the gate circuit 22 can be regarded as phase error signal obtained by converting 36 QAM signal equivalently to 4 PSK signal and frequency-doubling them, if this output is further frequency-doubled by an EX-OR circuit 29, resulting altogether in its frequency-quadrupling, there will be provided the phase error signal of the 36 QAM signal. Therefore, the output of the EX-OR circuit 29 is supplied by way of an LPF 30 to a VCO 31, so that there will be composed a phase synchronizing circuit.

As a phase synchronizing circuit can be composed as described above and, moreover, only signals at signal points A, B, C, F and I (FIG. 7) are used as phase error signals, circuitry for processing signals corresponding to letters E, D, G and H can be dispensed with. However, if it is simply dispensed with, the signals at E, D, G and H cannot contribute to phase error information but will merely constitute noise components, resulting in increased carrier phase jitters. Therefore, this problem is solved in the circuit of FIG. 10 in the following manner: The signals $X_1$, $X_4$ and $X_7$ according to which the signals at A, B, C, F and I are determined are subjected to OR operation by an OR circuit 27. The output of the OR circuit 27 and a clock signal are subjected to AND operation by an AND circuit 32. As a result, the clock signal will emerge at the output of the AND circuit 32 only when there is a signal required as phase error signal. Accordingly, if the output of the EX-OR circuit 29 is sampled by the output of the AND circuit 32 in a D-type flipflop 33, only signals needed as phase error signals will emerge at the output of the flipflop 33, but no unneeded signals will, and instead preceding needed signals will be maintained as the flip-flop output. Since the phase error signals will thus consist only of properly processed signals at A, B, C, F and I, the reference carrier wave can be reproduced with little amount of jitter.

Although a circuit for processing only the signals at A, B, C, F and I, out of 36 QAM signals, is shown in FIG. 10, signals that can be processed are not limited to them but can be freely selected in other combinations. However, since if the quantity of signals to be processed is too small relative to the overall signal quantity, the control information will become too little, giving rise to problems including a decrease in synchronization range, more than a half of the number of superpositions is considered desirable. The circuit composition of FIG. 10 is directly applicable not only to 36 QAM systems but also to a modulated wave having a signal arrangement lacking any signal point or points of 36 QAM signals. Furthermore, the means used in this composition can be expanded to readily realize a phase synchronizing circuit for multi-level, multi-phase modulated waves beyond 36 QAM.

The phase synchronizing circuit illustrated in FIG. 10 has within its loop two discriminator-shaper circuits, one consisting of the discriminator-shaper circuits 13 through 18 and the other of the D-type flipflop 33, which cause the loop to have one-bit delays, because each discriminator-shaper circuit, so operated as to achieve sampling discrimination at the median of the eye pattern of the signals, gives a half-bit delay. The loop's delay length determines the synchronous lock range; as a longer delay would narrow the lock range, the delay should be minimized.

In the circuit of FIG. 10, when the input signal is at the point of letter E, D, G or H in FIG. 7, the D-type flipflop also retains the phase error signal obtained from a signal at letter A, B, C, F or I. Accordingly, if signals not contributing to phase error information, i.e., signals corresponding to letters E, D, G and H, come in consecutively, the output of the D-type flipflop will be fixed at a value determined by the phase error signal provided by the signal preceding those corresponding to E, D, G and H, and as a result the phase synchronization loop will overrun.

These problems of delay length and loop overrunning can be solved by selecting with a gate circuit either the product of digital frequency-multiplication (the output Y of the EX-OR circuit 29) of the output of the phase detector or a periodic signal (clock). The selection is performed according to a signal (the output $X_1$, $X_4$ or $X_7$ of the OR circuit 27) for determining whether or not the phase detection output is a necessary signal for phase synchronization and by controlling the VCO with the output of the gate circuit. An example of the gate circuit for use herein is shown in FIG. 11.

Figure 11:
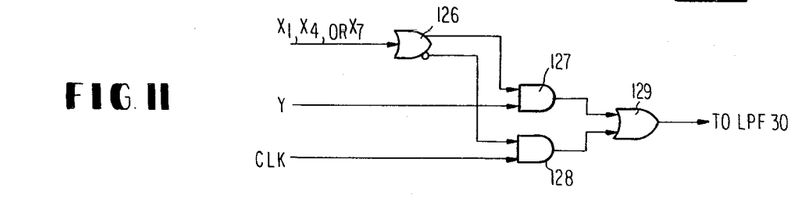
FIG. 11 schematically illustrates the gate circuit section of the circuit shown in FIG. 10.

In FIG. 11, the decision signal $X_1$, $X_4$ or $X_7$ from the OR circuit 27 is supplied to an OR/NOR circuit 126, of which the affirmative output is supplied, together with the output Y of the EX-OR circuit 29, to an AND circuit 127 and the negative output, together with the clock signal, to an AND circuit 128. The outputs of the AND circuits 127 and 128 are supplied to an OR circuit 129, whose output is used as control signal for the VCO 31. When the decision signal $X_1$, $X_4$ or $X_7$ is logic "1", the signal Y is supplied by the OR circuit 129, and when it is logic "0", the clock signal is.

When the input modulated signal is any one of signals corresponding to letters D, E, G and H in FIG. 7, the output of the gate circuit illustrated in FIG. 11 is the clock signal. Thus signals corresponding to letters D, E, G and H which do not contribute to phase error information but merely constitute noise are eliminated and replaced by the clock signal. Since this clock signal is adequately eliminated by the LPF 30, it does not constitute a noise component, and there can be reproduced the reference carrier wave with little amount of jitter. Even when signals corresponding to D, E, G or H, which do not contribute to phase error information, come in consecutively, the control signal for VCO 31 will not be fixed to a single phase error signal, and accordingly the loop can be prevented from overrunning. Furthermore, since only one stage of discriminator-shaper circuits 13 through 18 is provided in the loop, the loop delay time can be reduced.

Whereas a clock signal is used in this instance to replace the signals not contributing to phase error information (those corresponding to letter E, D, G or H), the substitute can be any periodic signal of 50 percent in mark rate (or duty) subject to sufficient suppression by the LPF 30. The foregoing description referred to a 36 QAM system, but this gate circuit of FIG. 11 obviously can be useful for other multi-level, multi-phase superposition-modulated systems as well.

With reference to FIGS. 1, 4, 5 and 10, compensation in the phase aspect alone was described, but no mention was made of that in the amplitude aspect, because the circuit according to the present invention, unlike prior devices which handle analog values, processes digital values and accordingly is much less subject to deterioration connected to amplitude variations than conventional circuits. However, it certainly is more desirable, performancewise, to add to the circuit of this invention a circuit for compensating in the amplitude aspect like in prior devices, although it would result in greater overall circuit dimensions.

Further, although the gate circuits 22, 32 and 90 are arranged preceding the frequency-multiplying means (EX-OR circuit 29) in FIGS. 1, 4, 5 and 10, the objective of the present invention can also be achieved if they follow the frequency-multiplying. In this case, however, a plurality of EX-OR circuits would be required for frequency-multiplying the output of the EX-OR circuit 28 and those of the group of discriminator-shaper circuits, which are orthogonal thereto. The phase synchronizing circuit of FIG. 1, for example, can be arranged as shown in FIG. 12.

As heretofore described, the present invention makes it possible to replace the analog switchs, which are needed in prior art, with a digital gate circuit and to dispense with the previously required analog delay lines. Not only can the circuit composition be thereby simplified, but also performance deterioration owing to the imperfection of the analog circuit can be obviated, so that a circuit with superior performance features can be realized. The invention, which uses no other circuits handling analog values than a phase shifter circuit, has the particular advantage of not having to worry much about performance deterioration due to circuit imperfection even if the number of superpositions increase.

Further, if the circuit according to this invention is so composed as to permit appropriate selection of the phases of input signals, it will have equal performance to a phase synchronizing circuit faithfully processing all the phases of input signals, and yet the circuit dimensions can be roughly halved. Moreover, if a periodic signal of about 50 percent duty factor is supplied as a control signal for the VCO in place of a phase error signal when a signal having a phase not contributing to phase error information is entered, there will be provided a phase synchronizing circuit having a wide lock range and free from loop overrunning.

What is claimed is:

1. A phase synchronizing circuit comprising:
voltage-controlled oscillator means responsive to a control signal for providing an output of varying oscillation frequency;
means for phase-detecting a multi-level, multi-phase superposition-modulated carrier wave with reference to the phase of the output of said voltage-controlled oscillator means the output of said phase-detecting means including at least first and second phase-orthogonal outputs;
means for demodulating the output of said phase detector means to provide a demodulated signal, the output of said demodulating means including at least one pair of mutually orthogonal demodulator outputs;
determining means responsive to said demodulated signal for providing output signals indicating the phase position of said modulated carrier wave with respect to the output phase of said voltage-controlled oscillator means;
a plurality of means for phase-shifting the output of said phase detector means by prescribed values the outputs of said phase-shifting means including at least one pair of mutually orthogonal phase-shifting means outputs;
a plurality of means for discriminating the outputs of said plurality of phase shifter means with reference to a prescribed threshold level, the outputs of said discriminating means including at least one pair of mutually orthogonal discriminating means outputs;
a plurality of first frequency-multiplier means for frequency-multiplying each pair of mutually orthogonal outputs among the outputs of said plurality of discriminator means;
second frequency-multiplier means for frequency-multiplying each pair of mutually orthogonal outputs among the outputs of said demodulator means;
first gate means responsive to the output of said determining means for selectively passing therethrough one output among the outputs of said plurality of first frequency-multiplier means;
third frequency-multiplier means for frequency-multiplying the output of said first gate means and that of said second frequency-multiplier means; and
means for supplying said voltage-controlled oscillator means with the output of said third frequency-multiplier means as said control signal.

2. A phase synchronizing circuit comprising:
voltage-controlled oscillator means responsive to a control signal for providing an output of varying oscillation frequency;
means for phase-detecting a multi-level, multi-phase superposition-modulated carrier wave with reference to the phase of the output of said voltage-controlled oscillator means, the output of said phase-detecting means including at least first and second phase-orthogonal outputs;
means for demodulating the output of said phase detector means to provide a demodulated signal, the output of said demodulating means including at least one pair of mutually orthogonal demodulator outputs;
determining means responsive to said demodulated signal for providing output signals indicating the phase position of said modulated carrier wave with respect to the output phase of said voltage-controlled oscillator means;
a plurality of means for phase-shifting the output of said phase detector means by prescribed values the outputs of said phase-shifting means including at least one pair of mutually orthogonal phase-shifting means outputs;
a plurality of means for discriminating the outputs of said plurality of phase shifter means with reference to a prescribed threshold level, the outputs of said discriminating means including at least one pair of mutually orthogonal discriminating means outputs;
first gate means responsive to the output of said determining means for selectively passing therethrough a pair of mutually orthogonal outputs among the outputs of said plurality of discriminator means;

first frequency-multiplier means for frequency-multiplying the pair of mutually orthogonal outputs selectively passed through said first gate means;

second frequency-multiplier means for frequency-multiplying a pair of mutually orthogonal outputs among the outputs of said demodulator means;

third frequency-multiplier means for frequency-multiplying the outputs of said first and second frequency-multiplier means; and means for supplying said voltage-controlled oscillator means with the output of said third frequency-multiplier means as said control signal.

3. A phase synchronizing circuit comprising:

voltage-controlled oscillator means responsive to a control signal for providing an output of varying oscillation frequency;

means for phase-detecting a multi-level, multi-phase superposition-modulated carrier wave with reference to the phase of the output of said voltage-controlled oscillator means the output of said phase-detecting means including at least first and second phase-orthogonal outputs;

means for demodulating the output of said phase detector means to provide a demodulated signal, the output of said demodulating means including at least one pair of mutually orthogonal demodulator outputs;

determining means responsive to said demodulated signal for providing output signals indicating the phase position of said modulated carrier wave with respect to the output phase of said voltage-controlled oscillator;

a plurality of means for phase-shifting the output of said phase detector means by prescribed values the outputs of said phase-shifting means including at least one pair of mutually orthogonal phase-shifting means outputs;

a plurality of means for discriminating the outputs of said plurality of said phase shifter means with reference to a prescribed threshold value, the outputs of said discriminating means including at least one pair of mutually orthogonal discriminating means outputs;

a plurality of first frequency-multiplier means for frequency-multiplying each pair of mutually orthogonal outputs among the outputs of said plurality of discriminator means;

second frequency-multiplier means for frequency-multiplying each pair of mutually orthogonal outputs among the outputs of said demodulator means;

a plurality of third frequency-multiplier means for frequency-multiplying the outputs of said plurality of first frequency-multiplier means and the output of said second frequency-multiplier means;

first gate means responsive to the output of said determining means for selectively passing therethrough any one of outputs of said plurality of third frequency-multiplier means;

means for supplying said voltage-controlled oscillator with the output of said first gate means as said control signal.

4. A phase synchronizing circuit of claim 1 or 2 further comprising holding means coupled between said third frequency-multiplier means and said supplying means and responsive to any one of the outputs of said determining means and to a clock signal for selectively holding the output of said third multiplier means.

5. A phase synchronizing circuit of claim 3 further comprising holding means coupled between said first gate means and said supplying means and responsive to any one of the outputs of said determining means and to a clock signal for selectively holding the output of said first gate means.

6. A phase synchronizing circuit of claim 1 or 2 further comprising a periodic signal source for providing a periodic signal and second gate means coupled between said third frequency-multiplier means and said supplying means and responsive to any one of the outputs of said determining means for passing therethrough either the output of said third frequency-multiplier means or said periodic signal.

7. A phase synchronizing circuit of claim 3 further comprising a periodic signal source for providing a periodic signal and second gate means coupled between said first gate means and said supplying means and responsive to any one of the outputs of said determining means for passing therethrough either the output of said first gate means or a periodic signal.

8. A phase synchronizing circuit as defined in claim 4, wherein said holding means comprises:

clock means for providing a clock signal at its output when enabled by any one of said determining means output signals; and flip-flop means having a clock terminal coupled to the output of said clock means, an input terminal coupled to the output of said third frequency-multiplier and an output terminal coupled to said supplying means.

9. A phase synchronizing circuit as defined in claim 5, wherein said holding means comprises:

clock means for providing a clock signal at its output when enabled by any one of said determining means output signals; and flip-flop means having a clock terminal coupled to the output of said clock means, an input terminal coupled to the output of said first gate means and an output terminal coupled to said supplying means.

10. A phase synchronizing circuit as defined in claim 6, wherein said second gate means comprises:

an OR/NOR gate receiving said determining means output signals as its input signals and providing an OR output and a NOR output;

a first AND gate receiving the output of said third frequency multiplier as a first input and said OR output as its second input, and providing an output;

a second AND gate receiving said periodic signal as a first input and said NOR output as a second input; and providing an output; and an OR gate receiving as its inputs the outputs from said first and second AND gates, said OR gate providing its output to said supplying means.

11. A phase synchronizing circuit as defined in claim 7, wherein said second gate means comprises:

a first AND gate receiving its first input from the output of the first gate means;

a second AND gate receiving said periodic signal as a first input and said NOR output as a second input; and providing an output; and an OR gate receiving as its inputs the outputs from said first and second AND gates, said OR gate providing its output to said supplying means.

* * * * *